(12) United States Patent
Muske et al.

(10) Patent No.: US 10,692,497 B1
(45) Date of Patent: Jun. 23, 2020

(54) SYNCHRONIZED CAPTIONING SYSTEM AND METHODS FOR SYNCHRONIZING CAPTIONING WITH SCRIPTED LIVE PERFORMANCES

(71) Applicants: Scott Muske, Encinitas, CA (US); Joy Sargis Muske, Encinitas, CA (US)

(72) Inventors: Scott Muske, Encinitas, CA (US); Joy Sargis Muske, Encinitas, CA (US)

( * ) Notice: Subject to any disclaimer, the term of this patent is extended or adjusted under 35 U.S.C. 154(b) by 0 days.

(21) Appl. No.: 15/713,136

(22) Filed: Sep. 22, 2017

Related U.S. Application Data

(60) Provisional application No. 62/415,761, filed on Nov. 1, 2016.

(51) Int. Cl.
| | |
|---|---|
| G10L 15/26 | (2006.01) |
| G10L 15/30 | (2013.01) |
| G02B 27/01 | (2006.01) |
| G10L 21/06 | (2013.01) |
| G06T 19/00 | (2011.01) |

(52) U.S. Cl.
CPC .......... *G10L 15/26* (2013.01); *G02B 27/0172* (2013.01); *G10L 15/30* (2013.01); *G10L 21/06* (2013.01); *G06T 19/006* (2013.01)

(58) Field of Classification Search
CPC ...................................... G10L 15/26
USPC ....................................... 704/235
See application file for complete search history.

(56) References Cited

U.S. PATENT DOCUMENTS

| | | | | |
|---|---|---|---|---|
| 5,648,789 A | * | 7/1997 | Beadles | G02B 27/017 345/8 |
| 7,742,609 B2 | * | 6/2010 | Yeakel | H04H 60/04 369/3 |
| 2002/0122136 A1 | * | 9/2002 | Safadi | H04N 5/445 348/465 |
| 2004/0213411 A1 | * | 10/2004 | Sakagami | H04S 3/002 381/1 |
| 2007/0188657 A1 | * | 8/2007 | Basson | H04N 21/233 348/468 |
| 2011/0072466 A1 | * | 3/2011 | Basso | G11B 27/10 725/47 |
| 2011/0134321 A1 | * | 6/2011 | Berry | G11B 27/10 348/464 |
| 2013/0204612 A1 | * | 8/2013 | Threewits | G09B 19/00 704/9 |
| 2014/0201631 A1 | * | 7/2014 | Pornprasitsakul | G06F 3/0484 715/716 |

(Continued)

*Primary Examiner* — Shaun Roberts
(74) *Attorney, Agent, or Firm* — Plager Schack LLP

(57) ABSTRACT

A synchronized captioning system and methods for synchronized captioning of scripted live performances are disclosed. The synchronized captioning system and methods provide accurate real-time captioning to a scripted live performance by ingesting a digital script, indexing and annotating the script with time duration, speech cadence, and performance details, and creating an enhanced digital script that includes encapsulated segments. Audience caption devices are registered to receive broadcast transmission of the encrypted script by identifying the correct encapsulated segment at the correct time. Speech is captured and converted to text, with pattern matching of text and time offset calculations timely transmit of each segment. The audience caption devices can pause, backup, move forward, and display live captions, with copyright protection enabled for the performance.

17 Claims, 15 Drawing Sheets

(56) References Cited

U.S. PATENT DOCUMENTS

2016/0234562 A1\* 8/2016 Arunkumar ........ H04N 21/4858
2016/0239675 A1\* 8/2016 Tobkin ............... G06Q 30/0609
2017/0092274 A1\* 3/2017 Kaufmann ............. G10L 15/26

\* cited by examiner

US 10,692,497 B1

SYNCHRONIZED CAPTIONING SYSTEM AND METHODS FOR SYNCHRONIZING CAPTIONING WITH SCRIPTED LIVE PERFORMANCES

CLAIM OF BENEFIT TO PRIOR APPLICATION

This application claims benefit to U.S. Provisional Patent Application 62/415,761, entitled "SYNCHRONIZED CAPTIONING SYSTEM AND METHOD FOR SYNCHRONIZING CAPTIONING WITH SCRIPTED LIVE PERFORMANCES," filed Nov. 1, 2016. The U.S. Provisional Patent Application 62/415,761 is incorporated herein by reference.

BACKGROUND

Embodiments of the invention described in this specification relate generally to captioning systems, and more particularly, to synchronized captions for scripted live performances.

Hearing impaired audience members require captions for live performances. Live or real-time captions are used to make live or fast turn-around programs accessible. Unlike offline captions created for prerecorded programs, captions created for live broadcast are not timed or positioned and rarely convey information other than the spoken dialogue. The inability to synchronize captions with a live performance makes it difficult for the hearing impaired audience. There is also no way to pause, backup, and resume the captions to allow a hearing impaired person to catch missed captions and context.

The two methods for captioning live programming include stenographic systems and manual live display. In a stenographic system, a "stenocaptioner" (a specially trained court reporter) watches and listens to the program as it airs and types every word as it is spoken. The stenocaptioner uses a special stenographic keyboard to type as many as 250 words per minute. A computer translates the "steno" into English text formatted as captions. The caption data is then sent to an encoder and displayed on a screen. This approach does not take advantage of a script and is recreating what the person is saying. This approach requires specialized personnel, with the cost of personnel and equipment being rather high. The approach also suffers from up to three to five second lag time between spoken work and captions. Furthermore, phonetic errors are common with this approach.

On the other hand, in a manual live display system, text is entered before the performance and displayed live at the time of the performance. Computer software products are available for creating live-display captions. Text for live display is often obtained by downloading it ahead of time or transcribing the audio of prerecorded segments. This approach has no easy way to synchronize with a live performance and, therefore, may require some type of human intervention to synchronize the captions during a live performance.

Therefore, what is needed is a way to provide accurate real-time captioning to a scripted live performance.

BRIEF DESCRIPTION

Embodiments of a synchronized captioning system and synchronized captioning processes for providing accurate real-time captioning to a scripted live performance are disclosed. In some embodiments, the synchronized captioning processes collectively carry out operations for ingesting a digital script, indexing and annotating the script with time duration, speech cadence, and performance details, and creating an enhanced digital script.

In some embodiments, the synchronized captioning processes include a high level synchronized captioning process for synchronizing captioning with scripted live performances, a synchronized captioning system login process, a script import process, a script annotation process, a live input source selection and assignment process, a learning mode process, a device registration process, a synchronized captioning playback process that happens during a scripted live performance, a high level process for displaying synchronized captions of a scripted live performance in captions glasses, a mobile application login process, a mobile application registration process, a process for connecting glasses, and a process for performing the synchronized captioning action. In some embodiments, the synchronized captioning processes collectively carry out operations for ingesting a digital script, indexing and annotating the script with time duration, speech cadence, and performance details, and creating an enhanced digital script.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
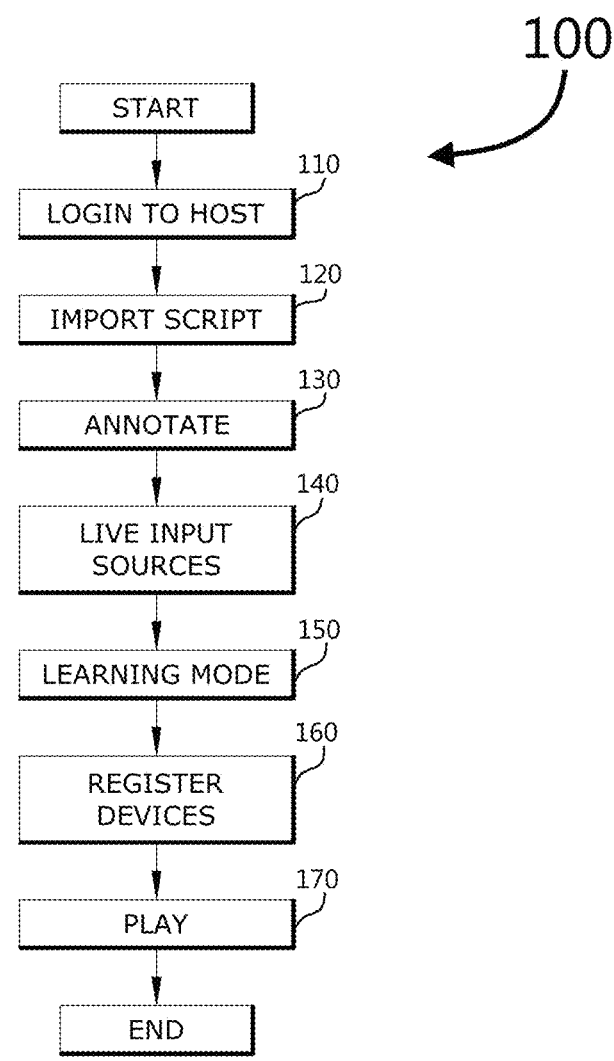

Having thus described the invention in general terms, reference is now made to the accompanying drawings, which are not necessarily drawn to scale, and which show different views of different example embodiments, and wherein:

FIG. 1 conceptually illustrates a high level synchronized captioning establishment process for setting up synchronizing captioning with scripted live performances in some embodiments.

Figure 2:
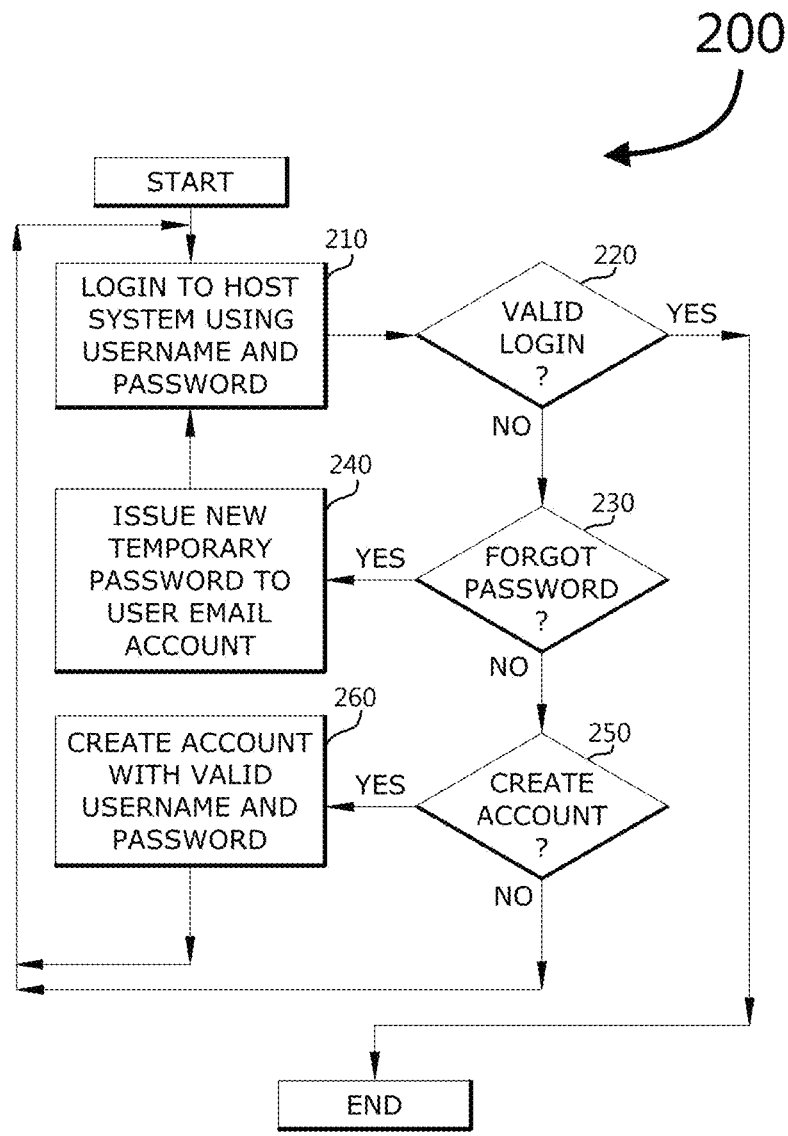

FIG. 2 conceptually illustrates a synchronized captioning system login process in some embodiments.

Figure 3:
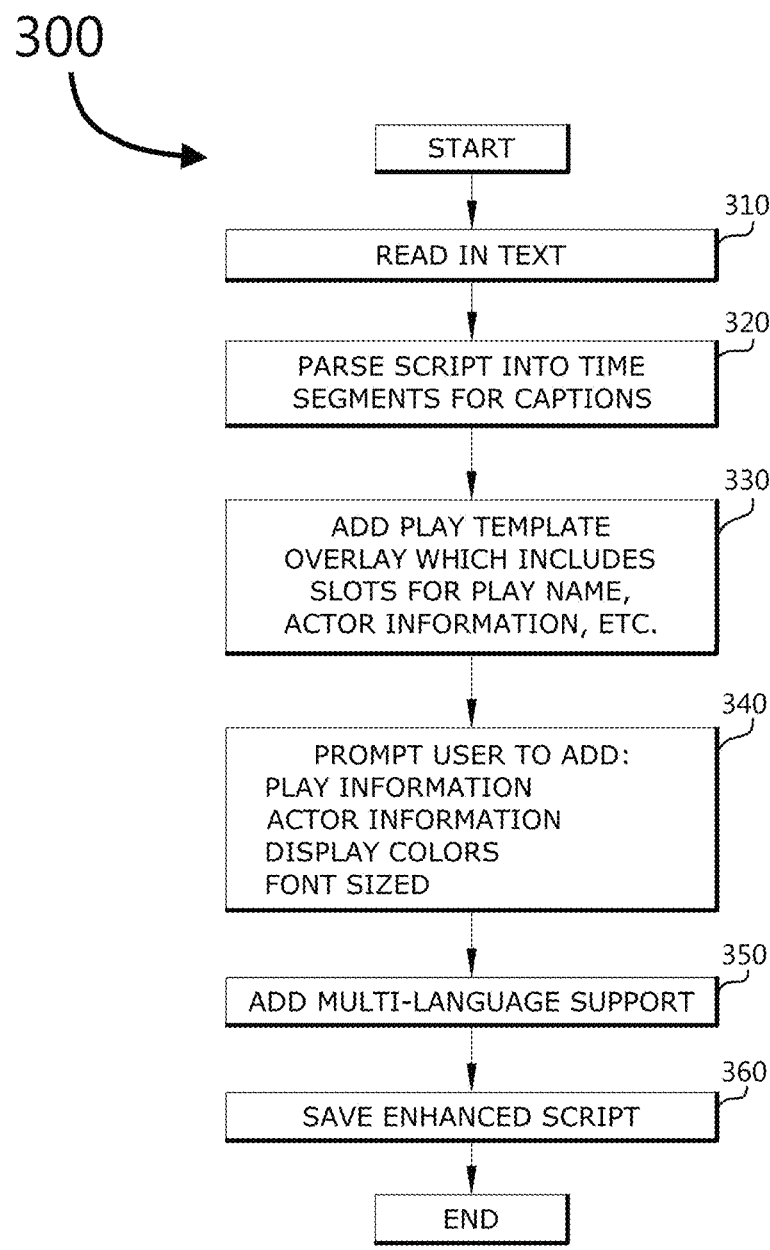

FIG. 3 conceptually illustrates a script import process in some embodiments.

Figure 4:
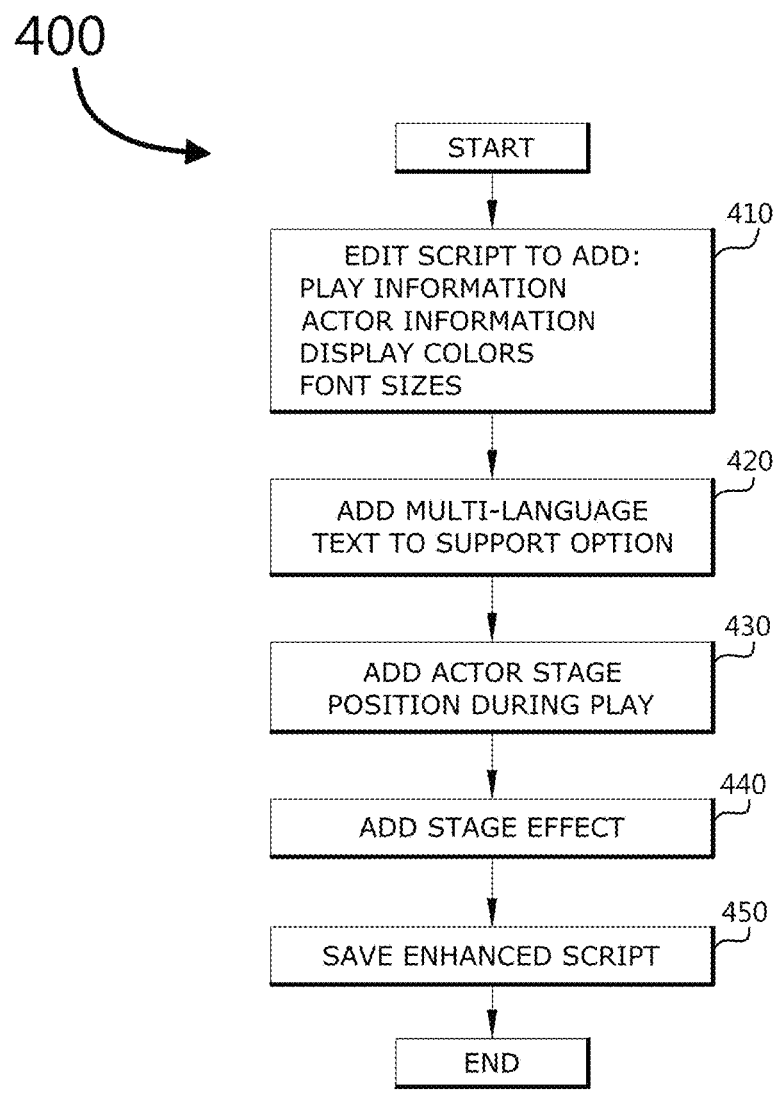

FIG. 4 conceptually illustrates a script annotation process in some embodiments.

Figure 5:
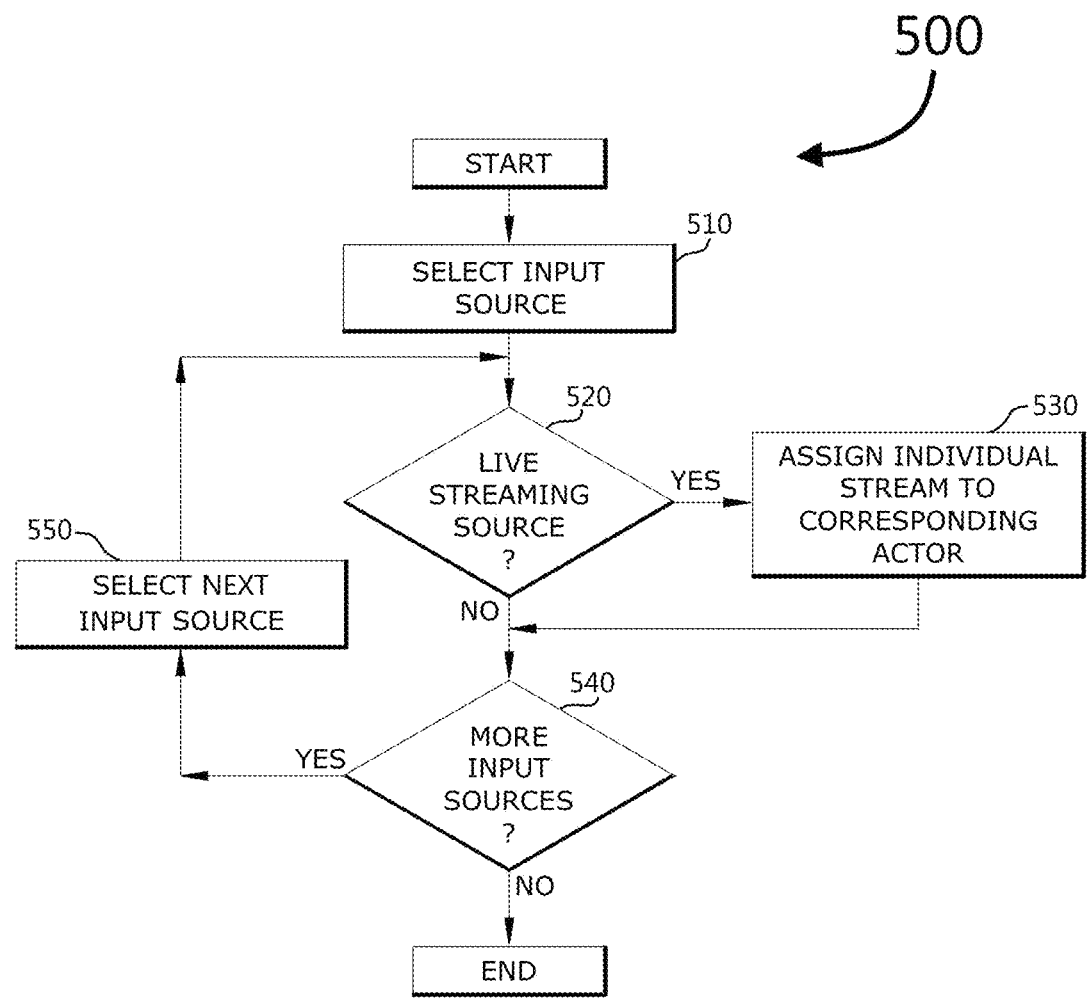

FIG. 5 conceptually illustrates a live input source selection and assignment process in some embodiments.

Figure 6:
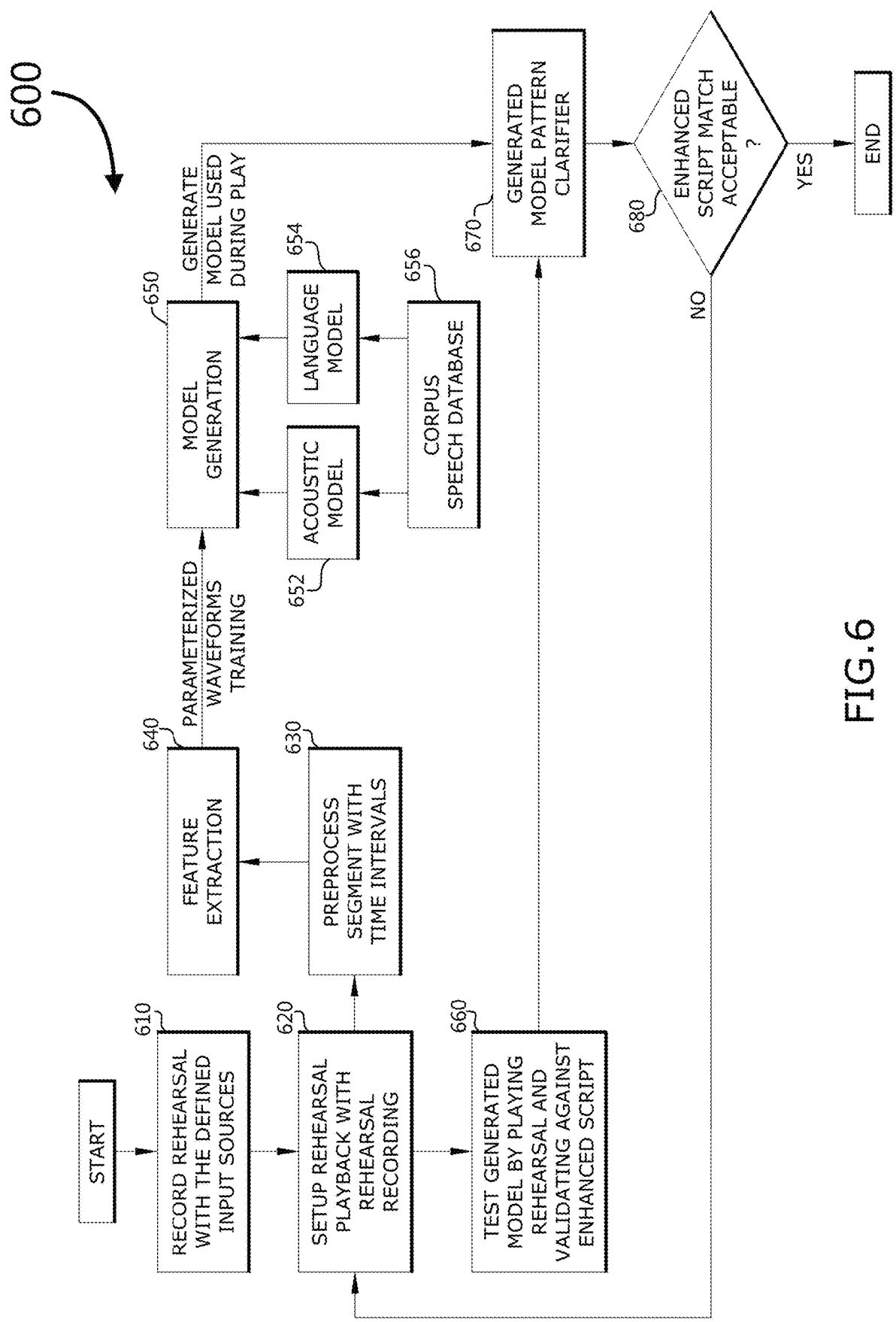

FIG. 6 conceptually illustrates a learning mode process in some embodiments.

Figure 7:
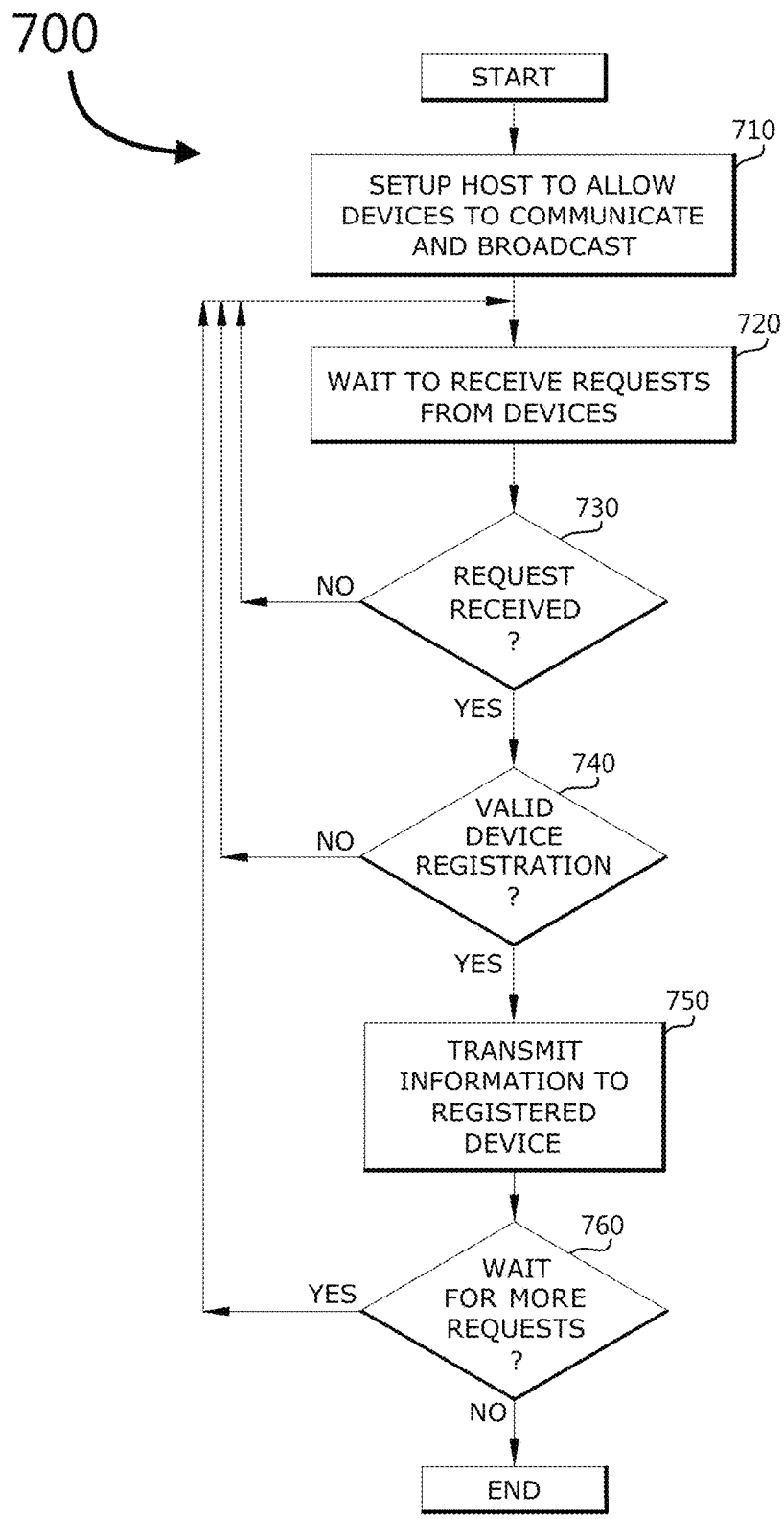

FIG. 7 conceptually illustrates a device registration process in some embodiments.

Figure 8:
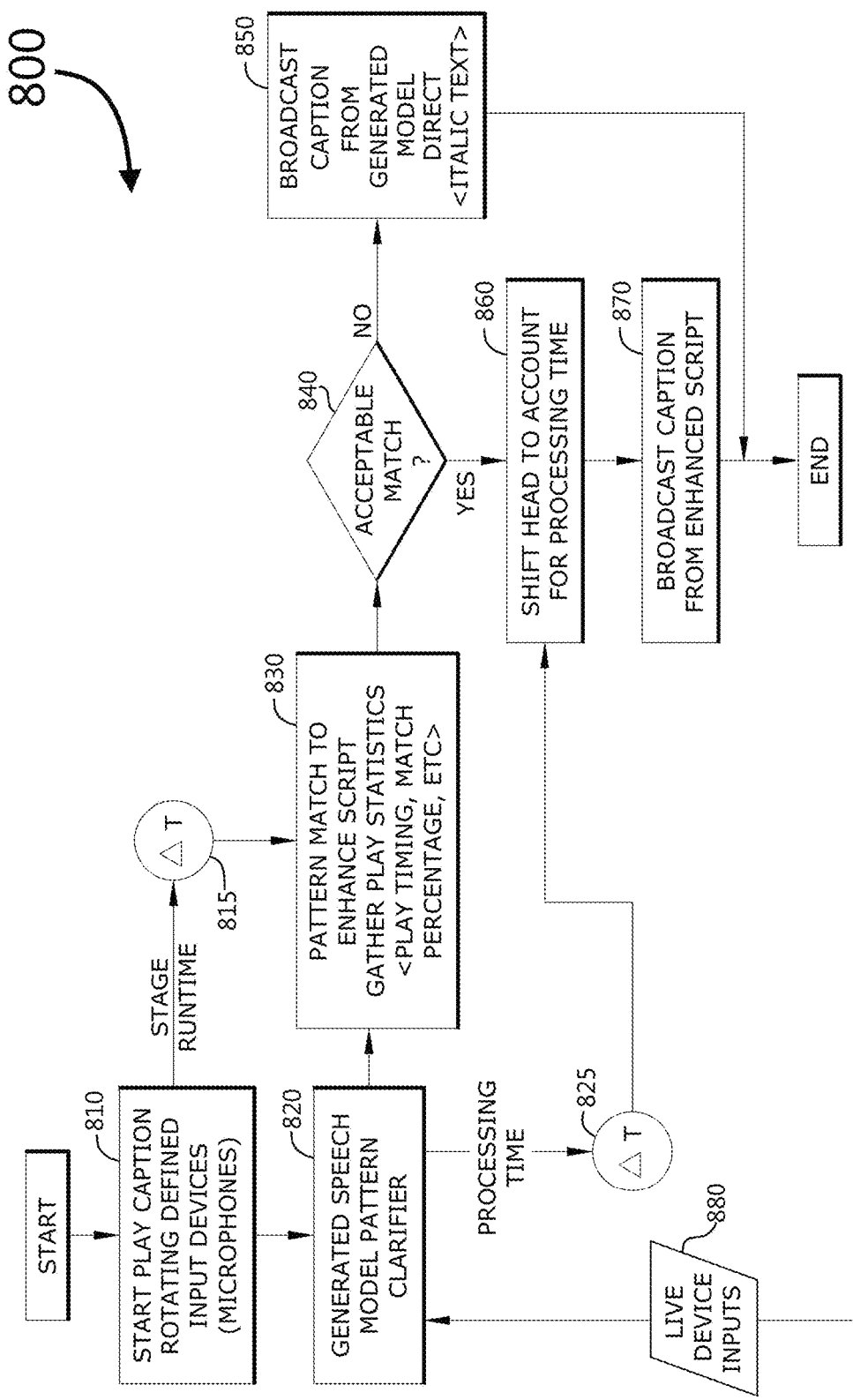

FIG. 8 conceptually illustrates a synchronized captioning playback process that happens during a scripted live performance in some embodiments.

Figure 9:
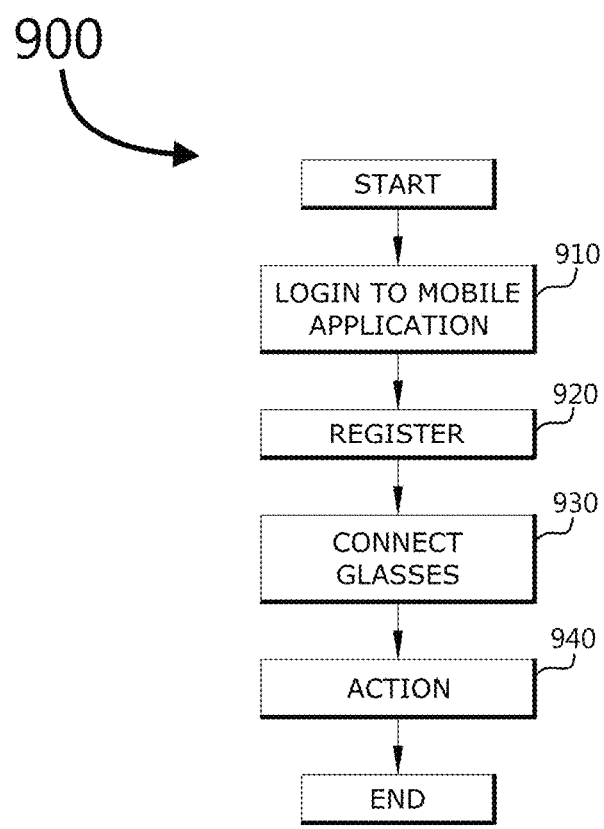

FIG. 9 conceptually illustrates a high level live event runtime process for displaying synchronized captions of a scripted live performance in captions glasses during a live event performance in some embodiments.

Figure 10:
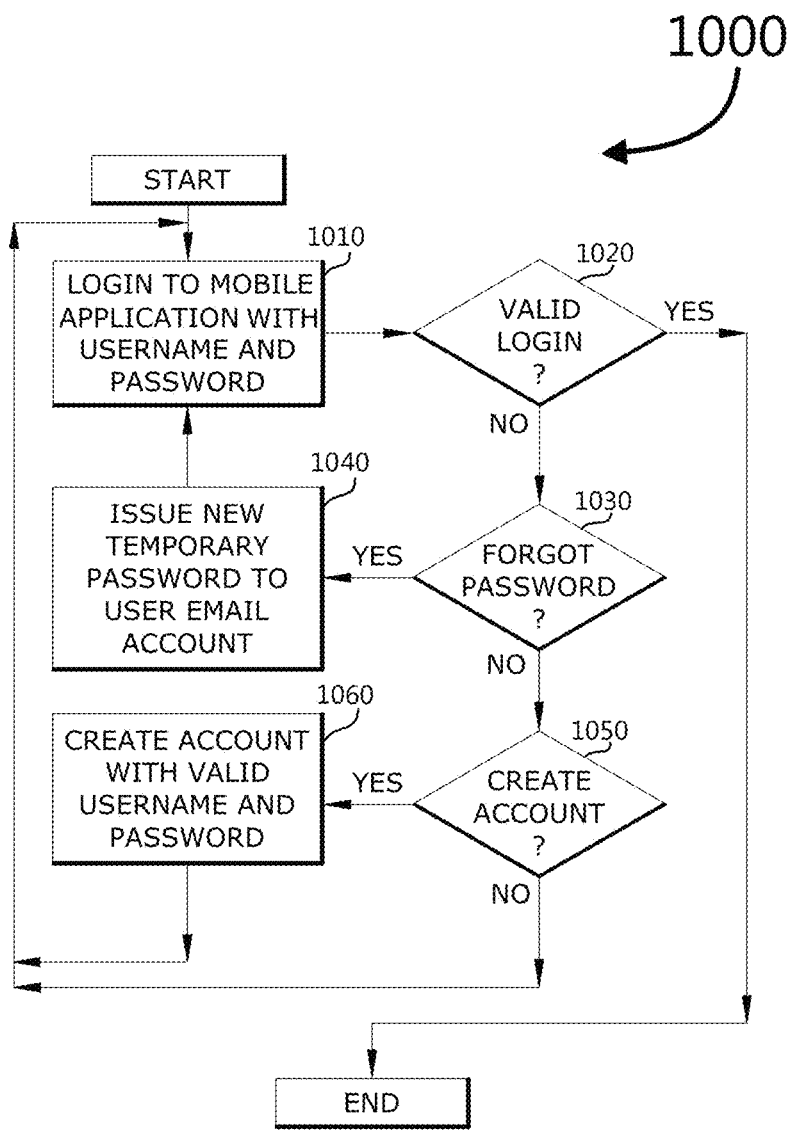

FIG. 10 conceptually illustrates a mobile application login process in some embodiments.

Figure 11:
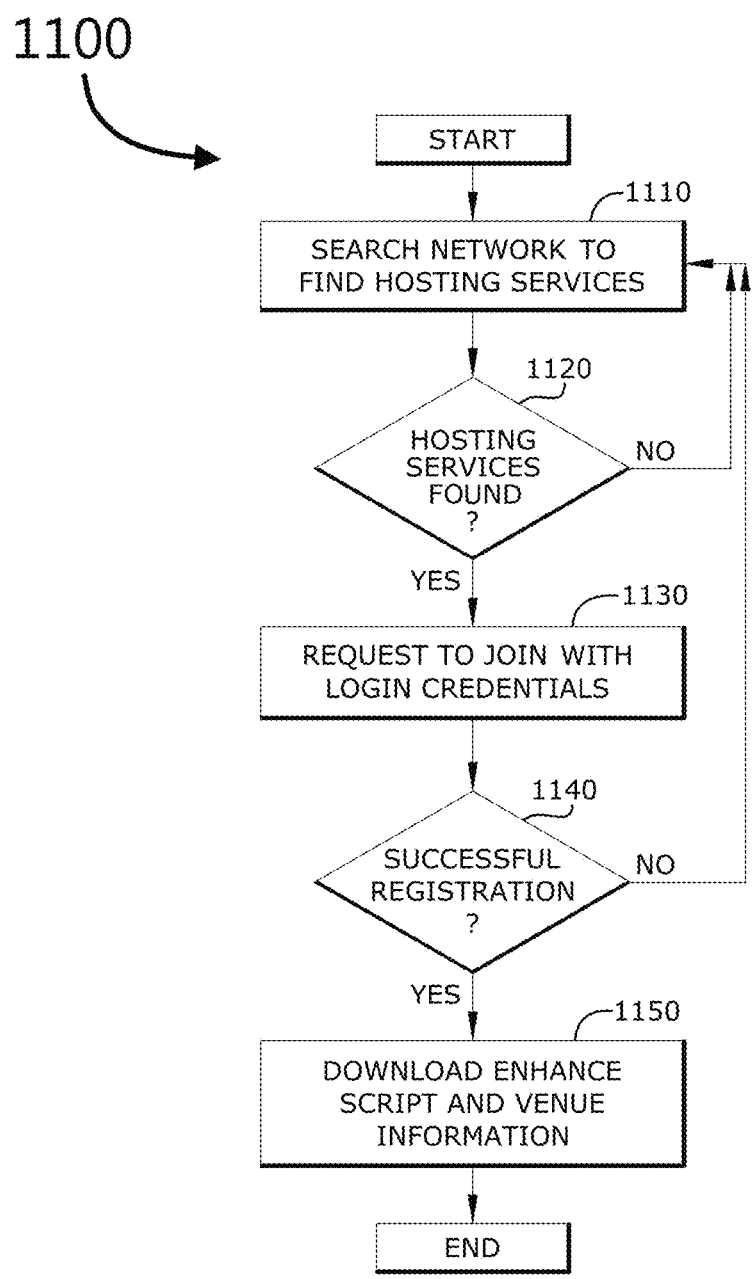

FIG. 11 conceptually illustrates a mobile application registration process in some embodiments.

Figure 12:
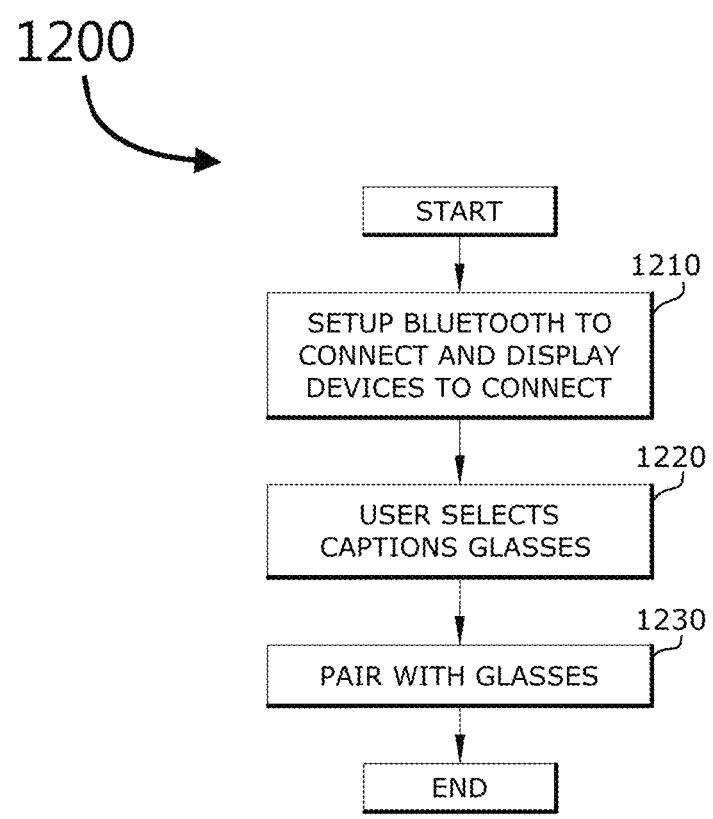

FIG. 12 conceptually illustrates a process for connecting glasses in some embodiments.

Figure 13:
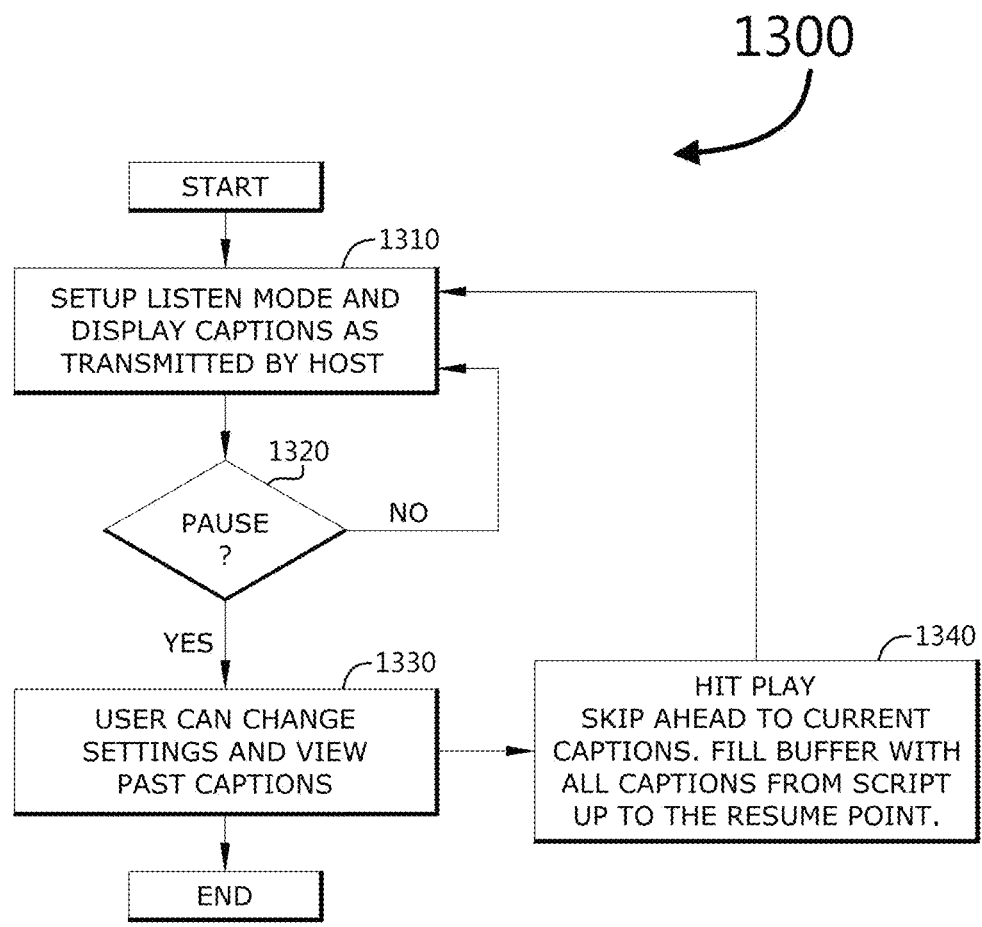

FIG. 13 conceptually illustrates a process for performing the synchronized captioning action in some embodiments.

Figure 14:
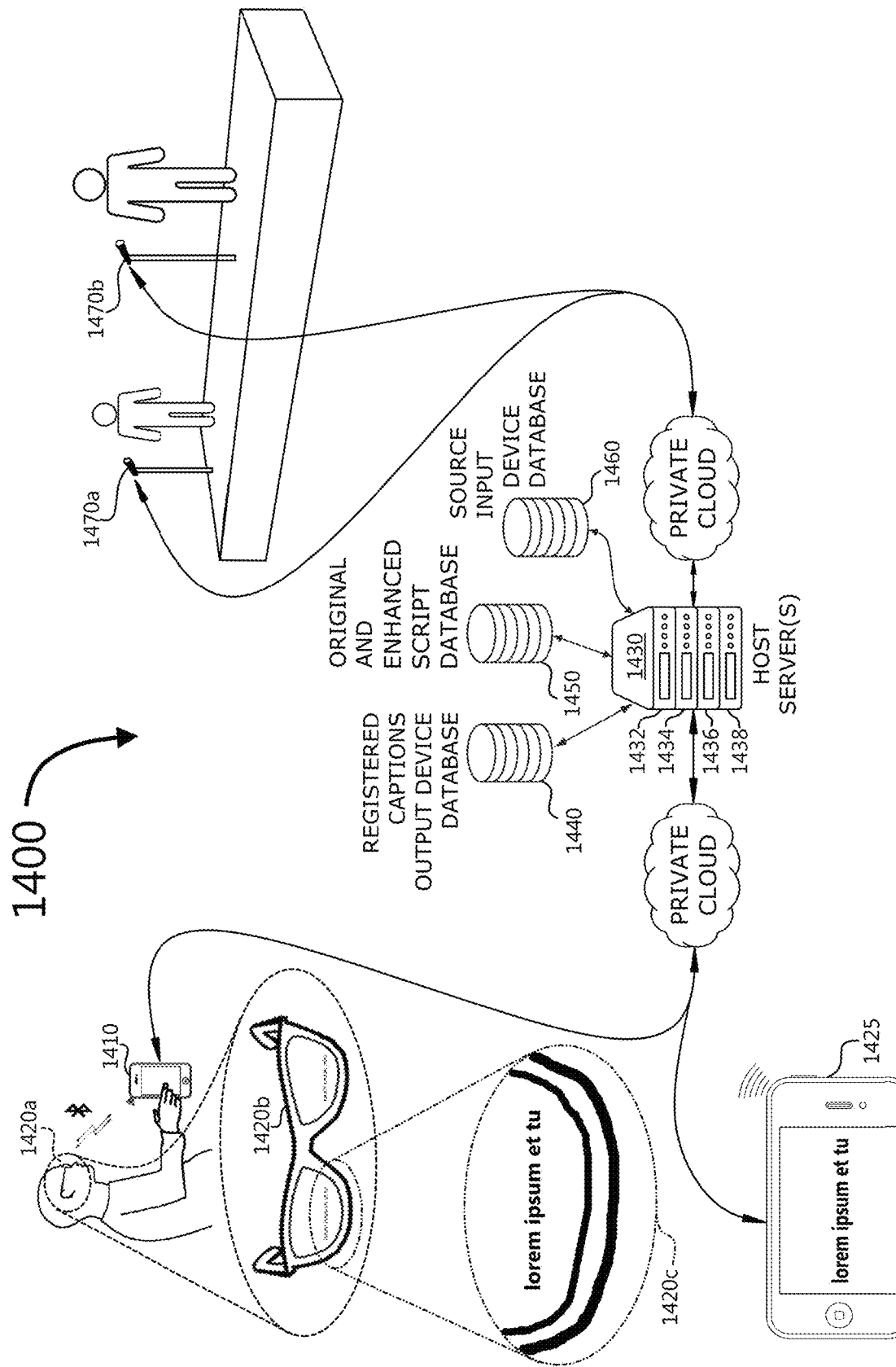

FIG. 14 conceptually illustrates an architecture of a synchronized captioning system that synchronizes captioning for a scripted live performance in some embodiments.

Figure 15:
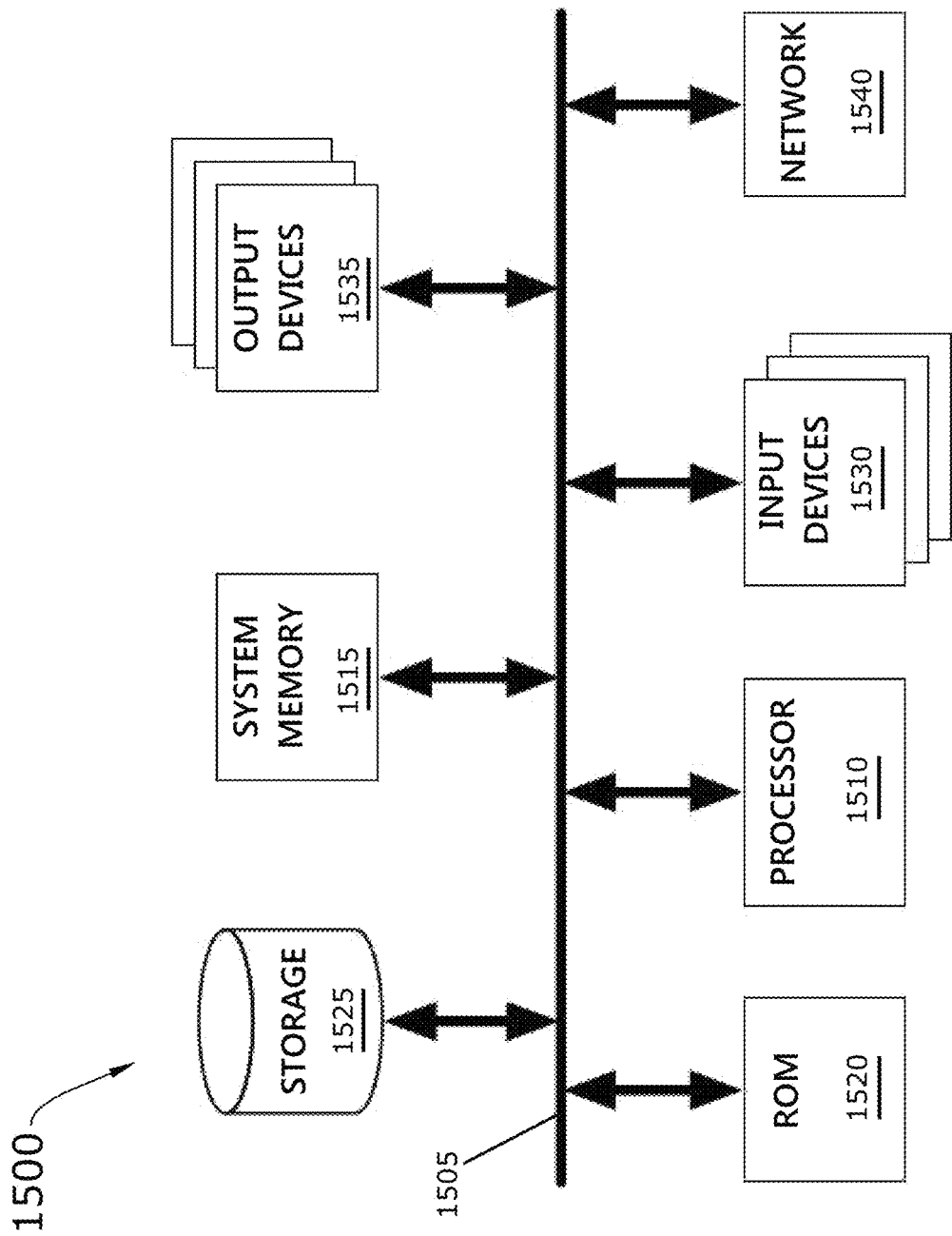

FIG. 15 conceptually illustrates an electronic system with which some embodiments of the invention are implemented.

DETAILED DESCRIPTION

In the following detailed description of the invention, numerous details, examples, and embodiments of a synchronized captioning system and synchronized captioning processes for providing accurate real-time captioning to a scripted live performance are described. In this description certain trademarks, word marks, and/or copyrights are referenced, including Wi-Fi®, which is a registered trademark of Wi-Fi Alliance, and the Bluetooth® word mark and logo, which are registered trademarks owned by Bluetooth SIG, Inc. However, it will be clear and apparent to one skilled in the art that the invention is not limited to the embodiments set forth and that the invention can be adapted for any of several applications, with or without reference to noted trademarks, word marks, and/or copyrights.

As defined in this specification, synchronized captioning refers to captioning that is displayed simultaneously, in near realtime, or contemporaneously with audible vocalizations and/or sounds of a live performance.

Some embodiments of the invention include a novel synchronized captioning system and synchronized captioning processes for providing accurate real-time captioning to a scripted live performance. In some embodiments, the synchronized captioning processes include a high level synchronized captioning process for synchronizing captioning with scripted live performances, a synchronized captioning system login process, a script import process, a script annotation process, a live input source selection and assignment process, a learning mode process, a device registration process, a synchronized captioning playback process that happens during a scripted live performance, a high level process for displaying synchronized captions of a scripted live performance in captions glasses, a mobile application login process, a mobile application registration process, a process for connecting glasses, and a process for performing the synchronized captioning action. In some embodiments, the synchronized captioning processes collectively carry out operations for ingesting a digital script, indexing and annotating the script with time duration, speech cadence, and performance details, and creating an enhanced digital script.

In this specification, there are several descriptions of methods and processes that are implemented as software applications or computer programs which run on computing devices to perform the steps of the synchronized captioning methods and/or processes. However, it should be noted that for the purposes of the embodiments described in this specification, the word "method" is used interchangeably with the word "process". Synchronized captioning processes or methods for synchronizing captioning with a scripted live performance are described, therefore, by reference to example methods that conceptually illustrate steps of synchronized captioning methods for displaying synchronized captions during a scripted live performance.

As stated above, hearing impaired audience members require captions for live performances. Live or real-time captions are used to make live or fast turn-around programs accessible. Unlike offline captions created for prerecorded programs, captions created for live broadcast are not timed or positioned and rarely convey information other than the spoken dialogue. The inability to synchronize captions with a live performance makes it difficult for the hearing-impaired audience. There is also no way to pause, backup, and resume the captions to allow a hearing-impaired person to catch up on missed captions and context.

The two existing methods for captioning live programming include stenographic systems and manual live display. However, the existing methods do not provide accurate real-time captioning to a scripted live performance. Specifically, the stenographic system does not take advantage of a script and is recreating what a person is saying, requiring specialized personnel and equipment at a high cost, with phonetic errors being common with this approach. Furthermore, the stenographic system suffers from up to three to five second lag time between spoken work and captions. The other existing method is a manual live display system in which text is entered before a performance and displayed live at the time of the performance. Yet, this approach has no easy way to synchronize with a live performance and, therefore, may require some type of human intervention to synchronize the captions during a live performance. For instance, the words of a performer who ad libs or deviates from the script during the live performance are missed in this approach.

Embodiments of the synchronized captioning system and the synchronized captioning processes described in this specification solve such problems by providing systematic, accurate, real-time captioning to a scripted live performance. The synchronized captioning system and synchronized captioning processes ingest a digital script, annotate the script with time duration, speech cadence, and performance details, such as venue information, seating, performance background, etc., and encapsulate the data into categorized segments of text, thereby creating an enhanced digital script. The enhanced digital script is encrypted to allow security controls over content dissemination. The methodology uses an onstage synchronized captioning registration system to register and track audience caption devices and broadcast the encrypted enhanced digital script to the registered devices at the beginning of the performance. In some embodiments, each registered device is pinged to determine the distance from the stage to the registered device, and thereby determine sound delay due to the speed of sound. In some other embodiments, each registered device is associated with a seating location that has a known distance from the stage, allowing the sound delay to be calculated and the synchronized captioning to be offset according to the calculated sound delay.

The onstage system listens to speech and audio from the performers. Performers' speech is captured in real-time by the onstage system, categorized by microphone to identify performer, and converted to text with enhanced information. Machine learning algorithms are used to pattern match text from the digital script to the live data, allowing the system to locate corresponding encapsulated data in the enhanced digital script. The caption timing is adjusted to match the cadence of the performance. The onstage system broadcasts the index to registered caption device(s) and integrates the calculated sound delay, thereby providing the correct timing for the sound to travel to the location of each registered device. Specifically, machine learning algorithms are used to pattern match text to corresponding lines and words of the digital script and locate corresponding index by looking ahead and calculating the correct time to transmit each encapsulated segment to each location, calculating and triangulating the live timing of the performance, the location of the audience member and the time sound takes to travel to that location. Analytics are collected from the performance to compare speech with the digital script, timing and accuracy of each performer, and other performance discrepancies. Machine learning is also used to optimize the digital script by enhancing the method for pattern matching and adjusting performance timing. In the audience, each registered caption device listens for the broadcast index and time variation to synchronize and display captions. With the encrypted enhanced digital script, each caption device will be able to pause, backup, move forward, and display live captions. In some embodiments, the caption devices will also be able to display text, or enhanced text with the performer speaking.

In some embodiments, the synchronized captioning system also inserts scripted ambiance-related material into the enhanced digital script at the correct time. For instance, ambiance-related scripted material may denote other ongoing actions on stage, such as rainfall, a car crash, a scream, or somber music.

In some embodiments, when a mismatch results from a performer not following the script, the synchronized captioning system detects the mismatch and transmits a message to the registered caption devices informing the audience of the mismatch. For instance, if a performer ad libs, misspeaks, skips parts of the script, or adds unscripted dialogue or other vocalizations, the synchronization system will detect a mismatch with the script and inform the audience that the performer is ad libbing.

Embodiments of the synchronized captioning system and synchronized captioning processes for providing accurate real-time captioning to a scripted live performance described in this specification differ from and improve upon currently existing options. In particular, some embodiments of the synchronized captioning system and synchronized captioning processes differ because the synchronized captioning system and synchronized captioning processes automate the synchronization of speech to captions. Furthermore, the synchronized captioning system and synchronized captioning processes create an encrypted display file to protect performance copyrights. The synchronized captioning system and synchronized captioning processes enable display of synchronized captions on multiple audience devices such as wearable computing devices, tablet computing devices, mobile computing devices (such as mobile phones), and viewing headsets. The synchronized captioning system and synchronized captioning processes provide a full set of playback controls which enable a viewing device to pause, backup, move forward, and display live captions during a performance. The synchronized captioning system and synchronized captioning processes collect analytic data about live performance and use "machine learning" to improve synchronization for subsequent performances.

In addition, these embodiments improve upon the currently existing options because only two methods for captioning live programming are presently available to consumers, including stenographic systems and manual live display. While a "stenocaptioner" (a specially trained court reporter) watches and listens to the program as it airs and types every word as it is spoken, this approach requires specialized personnel, and the cost of personnel and equipment may be cost-prohibitively high, with up to three to five second lag time between spoken word and the display of the caption text. Human and translation errors cause captions errors which keep the audience guessing what is happening and frustrated with the entire performance. The other currently existing option is the manual live caption display approach, which involves entering the text before the performance and displaying it live at the time of the performance. This approach does not include a synchronization methodology with the live performance and may require some type of human intervention to synchronize the captions during a live performance. This approach also neither includes a plan for transmission of unscripted audible content, such as when a performer ad libs dialogue, misses words or lines of the script, or misspeaks words or sentences, nor includes a plan for compensating for faster speech, slower speech, or dealing with inaudible speech.

In contrast, the synchronized captioning system and the synchronized captioning processes for providing accurate real-time captioning to a scripted live performance correct key problems by letting the user of a registered captioning device know who is speaking, delivering and displaying the captioned content contemporaneously with the live vocalization or spoken audible moment so the user can enjoy the performance, and detecting mismatches between scripted words or lines and unscripted dialogue which the performer actually vocalizes (or scripted words or lines which the performer misses or does not vocalize) and not transmitting the scripted material (which was not actually performed) when the performer has gone off script, as it may confuse the user to see captions for words or lines that were not spoken.

Several more detailed embodiments are described in the sections below. Section I describes synchronized captioning initialization processes for setting up synchronizing captioning with scripted live performances and playback of the synchronized captioning during the live performance. Section II describes live event runtime processes for displaying synchronized captions of a scripted live performance in captions glasses during a live event performance. Section III describes a synchronized captioning system. Section IV describes an electronic system that implements one or more of the methods and processes.

I. Synchronized Captioning Initialization Processes

By way of example, FIG. 1 conceptually illustrates a high level synchronized captioning establishment process 100 for setting up synchronizing captioning with scripted live performances. Several steps of the high level synchronized captioning establishment process 100 are described by reference to FIGS. 2-8, which conceptually illustrate more detailed processes of the corresponding steps in the high level synchronized captioning establishment process 100 of FIG. 1. Therefore, the descriptions pertaining to the individual steps of the high level synchronized captioning establishment process 100 are interleaved with descriptions of the more detailed corresponding processes laid out in FIGS. 2-8.

Referring initially to FIG. 1, the high level synchronized captioning establishment process 100 of some embodiments starts with operations to login to the host (at 110). Before synchronizing captioning in any case, a user needs to login to a host. The synchronized captioning process 100 of some embodiments connects to a local server computing device by wireless connection (e.g., connect wirelessly over WiFi). The local server computing device may host a synchronized captioning service which allows for importing a script, annotating the script, and which supports live input sources, one or more learning modes, and registered devices capable of synchronized captioning playback.

Further information for logging into the host is described in detail by reference to FIG. 2, which conceptually illustrates a synchronized captioning system login process 200. As shown in this figure, the synchronized captioning system login process 200 begins with a step to login (at 210) to host system using login credentials (i.e., a username and a password). The synchronized captioning system login process 200 then determines (at 220) whether the login attempt is valid. Specifically, the synchronized captioning system login process 200 performs authentication of the login credentials, namely, the username and the password.

When the login is valid, the synchronized captioning system login process 200 ends. On the other hand, when the login is not determined to be valid, then the synchronized captioning system login process 200 determines (at 230) whether the user has forgotten the password. For example, the user may select a tool for creation of a new password when the user has forgotten the password. When the invalid login is due to a forgotten password, the synchronized captioning system login process 200 of some embodiments issues a new temporary password (at 240) to the user email account. Then the synchronized captioning system login process 200 transitions back to login (at 210) to the host system, as described above.

On the other hand, when the invalid login is not determined to be due to a forgotten password, then the synchronized captioning system login process 200 determines (at 250) whether a new account creation request is being made. For example, the user may be new to the host system, and therefore, selects a tool for creating a new account. When the user wants to create an account, the synchronized captioning system login process 200 creates (at 260) an account with a valid username and password. Then the synchronized captioning system login process 200 transitions back to login (at 210) to the host system, as described above. Furthermore, when the user has not intended to create a new account, then the synchronized captioning system login process 200 transitions back to login (at 210) to the host system, as described above. Eventually, when the user provides valid login credentials, the synchronized captioning system login process 200 then ends.

Turning back to FIG. 1, the high level synchronized captioning establishment process 100 of some embodiments imports (at 120) a script after the user login is successful. Importing a script is described in detail by reference to FIG. 3, which conceptually illustrates a script import process 300. As can be seen in FIG. 3, the script import process 300 begins by reading in the text (at 310) of the script. Reading in the test of the script is a straight input operation, whether reading in the text is completed automatically by a computing device and scanner with optical character recognition which scans the printed text of a physical script, automatically by reading in the text of a digital script, or manually by user input.

After the text of the script is read in, the script import process 300 then parses (at 320) the script into time segments for captions. Next, the script import process 300 adds (at 330) a play template overlay which includes slots for play name, actor information, etc. The play template may be any kind of scripted performance template. For example, instead of a theatrical play, the play template may be based on a musical or another type of performance where a script is involved and live captioning is needed.

In some embodiments, the script import process 300 prompts the user to add information (at 340) including play information, actor information, display colors (for the captions), font size (of the captions). Next, the script import process 300 adds (at 350) multi-language support. After the above operations are complete, the script import process 300 saves (at 360) the enhanced script. Then the script import process 300 ends.

Turning back to FIG. 1, the high level synchronized captioning establishment process 100 of some embodiments annotates (at 130) the imported script. Annotating the script is described in detail by reference to FIG. 4, which conceptually illustrates a script annotation process 400. As can be seen in FIG. 4, the script annotation process 400 begins by editing the script (at 410) to add the play information, the actor information, the captioning display colors, and the captioning font sizes. The script annotation process 400 then adds (at 420) the multi-language text to support (as an option). In some embodiments, the script annotation process 400 adds (at 430) the actor stage position during the play for each of the actors in the script. The script annotation process 400 also adds the stage effects (at 440). Then the script annotation process 400 saves (at 450) the enhanced script and ends.

Now turning back to FIG. 1, the high level synchronized captioning establishment process 100 of some embodiments selects and assigns the live input device sources (at 140) to corresponding actors. Live input sourcing is described in detail by reference to FIG. 5, which conceptually illustrates a live input source selection and assignment process 500. As can be seen in FIG. 5, the live input source selection and assignment process 500 begins by selection of an input source (at 510). After an input source is selected, the live input source selection and assignment process 500 determines (at 520) whether the selected input source is a live streaming source. When the selected input source is not a live streaming source, the live input source selection and assignment process 500 then determines (at 540) whether there are more input sources to select. On the other hand, when the selected input source is determined (at 520) to be a live streaming source, then the live input source selection and assignment process 500 assigns the individual live stream to the corresponding actor (at 530). Then the live input source selection and assignment process 500 proceeds to the next step to determine (at 540) whether there are any more input sources to select.

In some embodiments, when there are more input sources to select, the live input source selection and assignment process 500 then selects (at 550) the next input source and transitions back to step 520 to determine whether the next selected input source is a live streaming source, as described in detail above. On the other hand, when there are no more input sources to select, then the live input source selection and assignment process 500 ends.

Referring to FIG. 1, the high level synchronized captioning establishment process 100 begins learning mode (at 150). Learning mode is described in detail by reference to FIG. 6, which conceptually illustrates a learning mode process 600. As can be seen in FIG. 6, the learning mode process 600 begins by recording (at 610) a rehearsal of the play with the defined input sources. Next, the learning mode process 600 sets up (at 620) rehearsal playback with rehearsal recording.

In some embodiments, the learning mode process 600 preprocesses (at 630) segments with time intervals and performs feature extraction (at 640). Parameterized waveforms training then takes place after preprocessing segment with time intervals and feature extraction, leading the learning mode process 600 to model generation (at 650) operations. In some embodiments, the model generation operations incorporates an acoustic model (at 652) and a language model (at 654), both derived from a corpus speech database (at 656), into the parameterized waveforms training in order to generate the model (at 650) used during the play.

Next, the learning mode process 600 of some embodiments submits the generated model to a pattern clarifier (at 670). However, in some embodiments, the learning mode process 600 tests (at 660) the generated model by playing rehearsal and validating against the enhanced script. Then the learning mode process 600 submits the generated model to the pattern clarifier (at 670).

After submitting the generated model to the pattern clarifier (at 670), the learning mode process 600 of some embodiments determines (at 680) whether the enhanced script match is acceptable. When the enhanced script match is not acceptable, the learning mode process 600 transitions back to step 620 to setup rehearsal playback with rehearsal recording, as described above. On the other hand, when the enhanced script match is determined (at 680) to be acceptable, the learning mode process 600 ends.

Again referring back to FIG. 1, the high level synchronized captioning establishment process 100 next performs device registration (at 160). Registering devices is described in detail by reference to FIG. 7, which conceptually illustrates a device registration process 700. As can be seen in FIG. 7, the device registration process 700 begins with setup (at 710) of the host to allow devices to communicate and broadcast. Next, the device registration process 700 waits (at 720) to receive requests from devices. For example, a user device is attempting to connect to the host to receive live performance captioning.

In some embodiments, the device registration process 700 determines (at 730) whether a device request is received. When no request is received, the device registration process 700 returns to step 720 to wait for requests from devices. On the other hand, when a device request is received, the device registration process 700 then determines (at 740) whether the requesting device has provided valid device registration information. Specifically, the device of a user should be registered before connecting to the host to receive captioning during the live performance. However, when the device is not registered, the device registration process 700 transitions back to waiting (at 720) to receive requests from devices. On the other hand, when the device is validly registered, the device registration process 700 transmits (at 750) information to the registered device.

Next, the device registration process 700 determines (at 760) whether to continue waiting for more device requests or not. In some embodiments, the device registration process 700 returns to step 720 when more waiting for device requests is called for. However, when it is determined (at 760) that no more waiting for device requests is needed, the device registration process 700 then ends.

Turning back to FIG. 1, the high level synchronized captioning establishment process 100 next starts live play captioning (at 160). The live play captioning (or "runtime" play captioning that occurs contemporaneously and in near synchronization with the script of the live play performance). Play captioning is described in detail by reference to FIG. 8, which conceptually illustrates a synchronized captioning playback process 800 that happens during a scripted live performance. As can be seen in FIG. 8, the synchronized captioning playback process 800 starts (at 810) play captioning by rotating the defined input devices. The defined input devices typically are microphones, but may include other devices for effects and/or vocalized dialogue of a script. Next, the synchronized captioning playback process 800 of some embodiments performs pattern clarification (at 820) by the generated speech model pattern clarifier.

In some embodiments, time offsets are set to account for stage runtime and processing time differences. Thus, after the start of play caption rotation of the input devices, the synchronized captioning playback process 800 sets (at 815) stage runtime difference and sets (at 825) processing time difference (both time difference settings shown symbolically in FIG. 8 as ΔT). Additionally, the live input devices 880 are input to the generated speech model pattern clarifier during the pattern clarification (at 820) performed for the rotated input devices (at 810).

The stage runtime difference (ΔT) 815 is provided as input when the synchronized captioning playback process 800 performs pattern matching to the enhanced script and gathers play statistics (at 830), including play timing, match percentage, etc. Next, the synchronized captioning playback process 800 determines (at 840) whether there is an acceptable match. When there is not an acceptable match, the synchronized captioning playback process 800 broadcasts (at 850) captioning from the generated model directly and displays the broadcast captioning in italics. On the other hand, when there is an acceptable match, the synchronized captioning playback process 800 shifts (at 860) the head by the processing time difference (ΔT) 825, provided by the generated speech model pattern clarifier (at 820). After shifting the head to account for the processing time difference, the synchronized captioning playback process 800 broadcasts (at 870) the captioning from the enhanced script. The captioning from the enhanced script is display in a normal (non-italicized) font, to inform the user (viewer) that the captioning reflects the live stream source, as opposed to following the script directly. Then the synchronized captioning playback process 800 ends.

II. Synchronized Captioning Playback Processes

By way of example, FIG. 9 conceptually illustrates a high level live event runtime process 900 for displaying synchronized captions of a scripted live performance in captions glasses during a live event performance. Several steps of the high level live event runtime process 900 are described by reference to FIGS. 10-13, which conceptually illustrate more detailed processes of the corresponding steps in the high level live event runtime process 900 of FIG. 9. Therefore, following cursory descriptions of the steps of the high level live event runtime process 900, each step of the high level live event runtime process 900 is described by reference to more detailed corresponding processes laid out in FIGS. 10-13.

Referring initially to FIG. 9, the high level live event runtime process 900 for displaying synchronized captions of a scripted live performance in captions glasses during a live event performance includes (i) login to a mobile application (at 910), (ii) registration (at 920), (iii) connecting captions glasses (at 930), and (iv) action (at 940). In some embodiments, the high level live event runtime process 900 starts by performing login (at 910) to the mobile application. Mobile application login is described in detail by reference to FIG. 10, which conceptually illustrates a mobile application login process 1000. As shown in FIG. 10, the mobile application login process 1000 begins with a step to login to the mobile application (at 1010) using login credentials, such as username and password.

Next, the mobile application login process 1000 of some embodiments determines (at 1020) whether the login credentials are valid. Although the login operations described above by reference to FIG. 2 pertain to a login connection of a device to a host, as opposed to a login operation to a mobile application as is performed by the mobile application login process 1000, the login operations of both processes are similar. For instance, the mobile application login process 1000 determines whether the login credentials are valid by checking whether the username and password are a matching pair of login credentials (e.g., by performing a key-value matching algorithm in comparison to stored encrypted login credentials).

When the login credentials are valid, the mobile application login process 1000 ends. Specifically, the login credentials are valid, so the user is authenticated and will by appropriately connected. On the other hand, when the login credentials are determined (at 1020) to be invalid (or not input by the user or otherwise not valid), the mobile application login process 1000 then determines (at 1030) whether the user has indicated that the password is forgotten. For example, the user may select a tool or a link to indicate that the password is forgotten, and to take steps to generate a new password.

When the password is determined to be forgotten, the mobile application login process 1000 of some embodiments issues (at 1040) a new temporary password for the user. The new temporary password is transmitted to the user in a secure manner, such as by sending the new password to a registered user email account which is stored with other user information in a registered user profile in some embodiments. After the new password is issued and transmitted to the user, the mobile application login process 1000 then returns to the step for login (at 1010) to the mobile application, as described above.

On the other hand, when the password is not forgotten, then the mobile application login process 1000 determines (at 1050) whether a new account is to be created. For example, the user may be using the live captioning features for the first time and, therefore, may be presently unregistered (with no user account). When the mobile application login process 1000 determines (at 1050) that the login problems are not related to new account creation, then the process 1000 simply reverts back to login (at 1010) to the mobile application to start over. On the other hand, when a new account is needed, the mobile application login process 1000 of some embodiments creates (at 1060) an account for the user with a valid username and password. Then the mobile application login process 1000 transitions back to login (at 1010) for the user to provide the valid login credentials. In some embodiments, after the user has provided the valid login credentials and after the user is properly authenticated, the mobile application login process 1000 ends.

In some embodiments, the high level live event runtime process 900 performs registration (at 920) after login is completed. Registration is described in detail by reference to FIG. 11, which conceptually illustrates a mobile application registration process 1100. As shown in FIG. 11, the mobile application registration process 1100 begins by searching (at 1110) the network to find hosting services. For example, a device may connect wirelessly to a WiFi network and search for a hosting service at a venue, such as at a theater. In some embodiments, the mobile application registration process 1100 determines (at 1120) whether any hosting service is found. When no hosting services are found, the mobile application registration process 1100 returns to the step for searching (at 1110) the network to find hosting services.

On the other hand, when a hosting service is found, the mobile application registration process 1100 of some embodiments requests (at 1130) to join the hosting service, providing login credentials to access the hosting service as a registered user. Next, the mobile application registration process 1100 determines (at 1140) whether registration with the hosting service was successful. When registration is unsuccessful, the mobile application registration process 1100 of some embodiments returns to searching (at 1110) the network for hosting services. However, when registration is determined (at 1140) to be successful, then the mobile application registration process 1100 of some embodiments downloads (at 1150) the enhanced script and venue information, in preparation for playback during the live event at the venue. Then the mobile application registration process 1100 ends.

After registration is successfully completed and the enhanced script and venue information are downloaded, the high level live event runtime process 900 performs operations to connect the glasses (at 930). Operations for connecting glasses are described in detail by reference to FIG. 12, which conceptually illustrates a process for connecting glasses 1200. As shown in FIG. 12, the process for connecting glasses 1200 begins with Bluetooth setup (at 1210) to connect captioning-capable glasses and displays a list of possible devices to connect. Next, the user selects (at 1220) captions glasses from the displayed list of devices to connect. In some embodiments, the process for connecting glasses 1200 then pairs (at 1230) the device to the glasses via Bluetooth. Then the process for connecting glasses 1200 ends.

In some embodiments, the high level live event runtime process 900 includes synchronized captioning action (at 940) during runtime while captions are transmitted by the host. Synchronized captioning action is described in detail by reference to FIG. 13, which conceptually illustrates a process for performing the synchronized captioning action 1300. As shown in FIG. 13, the process for performing the synchronized captioning action 1300 includes operations to setup listen mode and display captions (at 1310) as transmitted by the host. In some embodiments, the process for performing the synchronized captioning action 1300 determines (at 1320) whether to pause playback of the captions transmitted by the host and displayed in the glasses. When playback continues (not paused), the process for performing the synchronized captioning action 1300 then returns to displaying captions (at 1310). However, when the captions are paused, then the process for performing the synchronized captioning action 1300 transitions to a step during which the user can change settings and view past captions (at 1330).

In some embodiments, the user can choose to end playback of the captions display. Alternatively, the user can continue playback by selecting play (at 1340). When continuing playback, the process for performing the synchronized captioning action 1300 of some embodiments automatically skips ahead to captions that correspond to present live audio from one or more actors in the play or live event. For example, the user may pause captions display for five minutes. The device may continue to receive a stream of captions, but not display the captions when the user has paused playback. Nevertheless, when captioning playback resumes, the process 1300 skips ahead to "catch up" to the actual live event. In doing so, the process for performing the synchronized captioning action 1300 fills one or more memory buffers of the device with all captions from the script up to the actual resume point. In this way, the user can pause captioning playback for both short and long time periods without losing the ability to refocus on the live event with captioning being displayed according to the present position in the script of the live event. The process for performing the synchronized captioning action 1300 then returns to displaying captions (at 1310) in realtime, as described above.

III. Synchronized Captioning System

The synchronized captioning system and synchronized captioning processes for providing accurate real-time captioning to a scripted live performance of the present disclosure may be comprised of the following elements. This list of possible constituent elements is intended to be exemplary only and it is not intended that this list be used to limit the synchronized captioning system and synchronized captioning processes for providing accurate real-time captioning to a scripted live performance of the present application to just these elements. Persons having ordinary skill in the art relevant to the present disclosure may understand there to be equivalent elements that may be substituted within the present disclosure without changing the essential function or operation of the synchronized captioning system and synchronized captioning processes for providing accurate real-time captioning to a scripted live performance.

1. Synchronized Captioning Host Server(s)
2. Digital Script Processing Server Module
3. Source Input Device and Output Device Registration Server Module
4. Machine Learning and Reporting Server Module
5. Performance Runtime Server Module
6. Caption Display Device
7. Process Script and Display Captions
8. Trick Play Captions The various elements of the synchronized captioning system as described in this specification may be related in the following exemplary fashion. It is not intended to limit the scope or nature of the relationships between the various elements and the following examples are presented as illustrative examples only.

The Synchronized Captioning Host Server(s) includes at least one local or cloud based server running an application that performs the task of synchronizing the live performance to the enhanced script. This application will also be responsible for registering devices in the audience to be synchronized and for registering the stage microphones to listen to the performance.

The Digital Script Processing Server Module processes a digital script. This is a first step of the synchronized captioning method. When the method is implemented as a software application, and the application is running on the server (Synchronized Captioning Host Server), then the method ingests a digital script for the performance and adds a time slice with text length, embedded search logic, embedded performance information, and encrypts the digital script for copyright protection. After this is completed, the synchronized captioning method transitions to the next step, registration and download.

The Source Input Device and Output Device Registration Server Module performs registration and download operations for the synchronized captioning method to register devices to be used in the performance. Specifically, when the application is running on the PC Server, the synchronized captioning method registers microphones (source input devices) that will be used during the performance and uniquely identifies each microphone and associates the microphone with a particular speaker or actor of the performance. The microphones are input devices, that is, input from the live performance is received by the registered microphones. In addition to these input microphones, the synchronized captioning method also registers all of the audience caption devices that will be synchronized during the performance. The caption devices are output devices in the sense that they will be used to display live captioning for audience members during the performance. The enhanced digital script is then transmitted to the caption display devices upon registration with the Synchronized Captioning Host Server.

The Performance Runtime Server Module, as one of the Synchronized Captioning Host Server services, begins listening at the start of the performance. Speech is captured through the registered microphones and converted to text. The synchronized captioning method uses machine logic and neural-networks to best fit text to digital script to index captions, transitioning on this point to machine learning and reporting as performed by the Machine Learning and Reporting Server Module. Also, the synchronized captioning method sets the sync index and time shift, and then transmits the sync index and the time shift to each registered caption display device. In some embodiments, the Synchronized Captioning Host Server broadcasts the sync index and the time shift to all registered caption display devices.

The Machine Learning and Reporting Server Module 1438) performs machine learning and reporting. The synchronized captioning method of some embodiments also records performance analytics about how well the text matches the digital script, time deviations in performance, and changes to fitting algorithm. The synchronized captioning method generates reports on performance. the synchronized captioning method provides feedback changes to the enhanced digital script.

Caption Display Device(s) are structural elements of the synchronized captioning system, and can be any device that can run an application and be used in a performance setting. Examples of devices that would serve Caption Display Devices include tablet computing devices, mobile devices, wearable headsets, captions glasses, and goggles, etc.

Process Script and Display Captions occurs when the synchronized captioning method registers the corresponding Caption Display Device with the Synchronized Captioning Host Server and downloads the enhanced digital script with the associated encryption keys. The synchronized captioning method begins displaying captions at the start of the performance. The synchronized captioning method synchronizes the captions with the live performance based on the sync index and time shifts provided by the Synchronized Captioning Host Server.

Trick Play Captions are possible with the downloaded encrypted script. In some embodiments, the Caption Display Device performs steps of the synchronized captioning method to allow a user of the Caption Display Device to pause, backup, forward, and continue with live performance captions.

In some embodiments, one or more databases are employed to store registered input device that capture live audio and registered output devices for display of captions during the live performance. For example, one or more microphones may be registered as source input devices which correspond to particular speakers or actors, while an audience member may register a mobile device and captions glasses (that may be paired to the mobile device) to receive and display live captions during the performance.

By way of example, FIG. 14 conceptually illustrates an architecture of a synchronized captioning system 1400 that synchronizes captioning for a scripted live performance. As shown in this figure, the synchronized captioning system 1400 includes a mobile captions receiving device 1410, caption display devices including captions glasses 1420*a* of an audience member (or "user") and mobile captions displaying device 1425, synchronized captioning system host servers 1430, a registered captions output device database 1440, an original and enhanced script database 1450, a source input device database 1460, and registered microphone input devices 1470*a* and 1470*b*. The synchronized captioning system host servers 1430 include a digital script processing server module 1432, a source input device and output device registration server module 1434, a performance runtime server module 1436, and a machine learning and reporting server module 1438.

Each caption display device (i.e., captions glasses 1420*a* and mobile captions displaying device 1425) includes a combination of software application running on mobile device such as, but not limited to, a tablet computing, a mobile phone (or smartphone), captions glasses, goggles, and/or wearable headsets. In some embodiments, the captions glasses, the goggles, and the wearable headsets may be paired to a separate mobile computing device via a near field wireless signal, such as Bluetooth, and may receive the captions from the separate mobile computing device when the host server transmits the enhanced script to the registered mobile computing device.

The synchronized captioning system 1400 is deployed for a live performance, as shown by the actors, singers, or speakers on the stage near the registered microphone input devices 1470*a* and 1470*b*. Unique identifiers for the registered microphone input devices 1470*a* and 1470*b* are stored in the source input device database 1460. In this way, the synchronized captioning system 1400 works to provide accurate real-time captioning to the scripted live performance, combining multiple technologies to create a unique process for delivering captions during the scripted live performance. The scripted live performance could be any such performance in which a script it used, but whose actors, singers, or speakers may deviate from the script. Any venue is conceivable, including theaters with digital scripts, scripted concerts, and other scripted venues.

The synchronized captioning system 1400 starts with the digital script being ingested by the digital script processing server module 1432 of the synchronized captioning system host servers 1430. The digital script is stored in the original and enhanced script database 1450. Then the digital script is uniquely indexed, annotated with time duration, speech cadence, and performance details, thereby producing an enhanced script. The enhanced scripted is then encrypted for storage in the original and enhanced script database 1450 and for subsequent performance broadcast.

Next, the source input device and output device registration server module 1434 registers audience members with caption display devices 1420*a* and 1425 to join the performance broadcasts. Unique identifiers of the caption display devices 1420*a* and 1425 are then stored in the registered captions output device database 1440. The encrypted enhanced digital script is downloaded from the original and enhanced script database 1450 and transmitted to the caption devices 1420*a* and 1425 in the audience with unique encryption keys.

Just as live performance is to begin, the performance runtime server module 1436 and the microphone input devices 1470*a* and 1470*b* are put into listening mode to take thespian speech input. This speech is converted to text, pattern matched to identify performance location and time shifted to select the correct index for the caption text. Speech accuracy of the text is compared to the digital script and tracked for performance accuracy. The synchronized captioning system host server 1430 broadcasts the index to caption display devices 1420*a* and 1425 in the audience.

The caption display devices 1420*a* and 1425 shown in this example include mobile phone (smartphone) and captions glasses, but other caption display devices are supported by the synchronized captioning system 1400, including smart headsets, tablet computing devices, other mobile computing devices, or any other device that can receive Wi-Fi or Li-Fi transmission and which is capable of executing an application that can receive, decrypt, and display captions, as well as register with the source input device and output device registration server module 1434 of the synchronized captioning system host server 1430 and download the encrypted digital script. The audience caption display device should be capable of listening for broadcast of an index from the synchronized captioning system host server 1430. When an index is received the caption display device locates the index in the encrypted digital script and displays the associated text on the display. Close-up views of the captions glasses 1420*a* of the user are shown in dashed outlines of captions glasses 1420*b* and 1420*c*.

Furthermore, the caption display device may integrate a trick play module that allows the audience member to pause, backup, forward, and view live captions for the performance. This approach removes the latency in speech to text conversions.

To make the synchronized captioning system and synchronized captioning processes for providing accurate real-time captioning to a scripted live performance of the present disclosure, an individual may use a combination of software application and standard computing hardware. The application may be created for the synchronized captioning system host server 1430. Stage microphones 1470*a* and 1470*b* are used to capture presenter's speech. Open source or proprietary speech to text algorithms may be used to generate text. Artificial Intelligence (AI) and machine learning algorithms with fuzzy logic neural-network may be used to best fit the text to digital script and identify the location in the script. Wi-Fi or Li-Fi may be used to connect, register, and transmit the enhanced digital file to caption display devices 1420*a* and 1425. The application will transmit sync index and time shifts to caption display to maintain synchronization with the performance. The application may gather statistical data on how well the fitting was with the digital script, delays in performance, timing of each presenter, and accuracy of each presenter. This information can be displayed real-time, in a final report, and is fed back into the enhanced digital script to provide better timing and fitting.

The application created for the captions display device may connect via Wi-Fi or Li-Fi and register with the source input device and output device registration server module 1434 of the synchronized captioning system host server 1430. The application may be capable of decrypting the enhanced digital script using standard encryption keys. Devices shall display captions for use in a performance setting. This includes dark background/light text. This will also have multiple colors for different presenters and settings in the digital script. This will also be capable of shifting captions with correct time delta to maintain synchronization.

Enhanced digital script can be provided in multiple languages and could be selected by the caption display device. Onstage Devices can also act as the caption display device. This provides a mobile option to live captions.

To use the synchronized captioning system and synchronized captioning processes for providing accurate real-time captioning to a scripted live performance of the present disclosure, the invention may be used for any live scripted venue. This would include, without limitation, theater, opera, and music performances. The synchronized captioning system and synchronized captioning processes for providing accurate real-time captioning to a scripted live performance of the present disclosure may be used by venue producers to broadcast captions and enhance performance. Hearing impaired individuals and/or general users will be able to read captions in sync with the live performance. The user will also be able to pause, backup, forward, and return to live to enhance the experience.

Additionally, the synchronized captioning system and synchronized captioning processes for providing accurate real-time captioning to a scripted live performance of the present disclosure involves matching live audio to scripts and could therefore be adapted for use in any of several broadcast and live media broadcast contexts. Furthermore, the indexing could be embedded in the recorded audio based on the syncing methods.

The above-described embodiments of the invention are presented for purposes of illustration and not of limitation.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 15 conceptually illustrates an electronic system 1500 with which some embodiments of the invention are implemented. The electronic system 1500 may be a computer, phone, PDA, or any other sort of electronic device. Such an electronic system includes various types of computer readable media and interfaces for various other types of computer readable media. Electronic system 1500 includes a bus 1505, processing unit(s) 1510, a system memory 1515, a read-only 1520, a permanent storage device 1525, input devices 1530, output devices 1535, and a network 1540.

The bus 1505 collectively represents all system, peripheral, and chipset buses that communicatively connect the numerous internal devices of the electronic system 1500. For instance, the bus 1505 communicatively connects the processing unit(s) 1510 with the read-only 1520, the system memory 1515, and the permanent storage device 1525.

From these various memory units, the processing unit(s) 1510 retrieves instructions to execute and data to process in order to execute the processes of the invention. The processing unit(s) may be a single processor or a multi-core processor in different embodiments.

The read-only-memory (ROM) 1520 stores static data and instructions that are needed by the processing unit(s) 1510 and other modules of the electronic system. The permanent storage device 1525, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1525.

Other embodiments use a removable storage device (such as a floppy disk or a flash drive) as the permanent storage device 1525. Like the permanent storage device 1525, the system memory 1515 is a read-and-write memory device. However, unlike storage device 1525, the system memory 1515 is a volatile read-and-write memory, such as a random access memory. The system memory 1515 stores some of the instructions and data that the processor needs at runtime. In some embodiments, the invention's processes are stored in the system memory 1515, the permanent storage device 1525, and/or the read-only 1520. For example, the various memory units include instructions for processing appearance alterations of displayable characters in accordance with some embodiments. From these various memory units, the processing unit(s) 1510 retrieves instructions to execute and data to process in order to execute the processes of some embodiments.

The bus 1505 also connects to the input and output devices 1530 and 1535. The input devices enable the user to communicate information and select commands to the electronic system. The input devices 1530 include alphanumeric keyboards and pointing or cursor control devices. The output devices 1535 display images generated by the electronic system 1500. The output devices 1535 include printers and display devices, such as cathode ray tubes (CRT) or liquid crystal displays (LCD). Some embodiments include a touchscreen that functions as both an input and output device.

Finally, as shown in FIG. 15, bus 1505 also couples electronic system 1500 to a network 1540 through a network adapter (not shown). In this manner, the computer can be a part of a network of computers (such as a local area network ("LAN"), a wide area network ("WAN"), or an Intranet), or a network of networks (such as the Internet). Any or all components of electronic system 1500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-13 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory computer readable medium storing a synchronized captioning program which when executed by at least one processing unit of a computing device provides accurate real-time captioning to a scripted live performance, said synchronized captioning program comprising sets of instructions for:
    receiving a digital script file comprising a script with text associated with a scripted live performance;
    reading in the text of the script associated with the scripted live performance;
    parsing the text of the script into time segments at which to display specific captions in connection with the scripted live performance;
    adding the time segments for captions to the script;
    adding a template overlay to the script, said template overlay comprising a slot for a performance name and a slot for live performance actor information related to one or more actors designated to perform in the scripted live performance;
    requesting that a user provide captions and scripted live performance information to enhance the script, wherein the captions and scripted live performance information comprises the performance name, live performance actor information of at least one actor, captions display colors, and captions font size;
    receiving user input comprising the captions and scripted live performance information;
    adding the captions and scripted live performance information to the script based on the slots of the template overlay;
    saving the script and the captions and scripted live performance information as an enhanced digital script for the scripted live performance;
    annotating the enhanced digital script with information related to the scripted live performance;
    registering a microphone as a live streaming source that will be used to capture speech during performance of the scripted live performance;
    assigning the live streaming source to a first actor designated to speak into the registered microphone during the scripted live performance;
    registering a caption display device that will be used by an audience member to view captions of the captured speech during performance of the scripted live performance;
    receiving speech of the first actor captured by the registered microphone during performance of the scripted live performance;
    generating captions for display comprising at least one of script captions and captions of the captured speech of the first actor;
    displaying the captions on the registered caption display device during performance of the scripted live performance; and
    displaying the template overlay slot for live performance actor information on the registered caption display device, wherein the display of the template overlay slot for live performance actor information displays a name of the first actor when captions of the captured speech of the first actor is displayed on the registered caption display device.

2. The non-transitory computer readable medium of claim 1, wherein the set of instructions for receiving a digital script file comprises a set of instructions for:
    ingesting the script of the digital script file for the scripted live performance.

3. The non-transitory computer readable medium of claim 1, wherein the set of instructions for annotating comprises sets of instructions for:
    annotating the enhanced digital script by addition of a time slice with text length corresponding to each parsed time segment;
    adding embedded search logic to the enhanced digital script; and
    adding embedded performance information.

4. The non-transitory computer readable medium of claim 3, wherein the synchronized captioning program further comprises a set of instructions for encrypting the enhanced digital script for copyright protection.

5. The non-transitory computer readable medium of claim 1, wherein the set of instructions for generating captions comprises sets of instructions for:
    converting the captured speech into readable text;
    performing a pattern match comparison of the readable text of the captured speech to script captions at a time segment of the enhanced digital script corresponding to a time at which the speech was captured;
    identifying deviations in time and content between the readable text of the captured speech and the script captions at the time segment of the enhanced digital script;
    determining whether an acceptable match exists between the readable text of the captured speech and the script captions at the time segment of the enhanced digital script based on the pattern match comparison;

generating italicized captions based on the readable text of the captured speech when an acceptable match does not exist;

setting a synchronized index and a time shift that balances the identified deviations and generating captions from the enhanced digital script when an acceptable match exists for accurate captioning display on the registered caption display device during the scripted live performance; and broadcasting the generated captions from the enhanced digital script taking into account the distance from the performance at which the registered caption display device is calculated to receive and display the generated captions.

6. The non-transitory computer readable medium of claim 5, wherein the live captioning is displayed in synchronized form contemporaneously with actual speech based on application of the synchronized index and time shift to the live captioning display device.

7. The non-transitory computer readable medium of claim 1, wherein the synchronized captioning program further comprises a set of instructions for recording a rehearsal of the scripted live performance using the registered microphone.

8. The non-transitory computer readable medium of claim 7, wherein the synchronized captioning program further comprises a set of instructions for generating an enhanced script model based on the recorded rehearsal of the scripted live performance.

9. The non-transitory computer readable medium of claim 8, wherein the synchronized captioning program further comprises sets of instructions for:

preprocessing a plurality of segments with time intervals for the recorded rehearsal;

extracting a set of features in the segments of the recorded rehearsal; and converting the plurality of segments with time intervals and the extracted features to parameterized waveforms for generation of the enhanced script model.

10. The non-transitory computer readable medium of claim 9, wherein the synchronized captioning program further comprises sets of instructions for:

generating the enhanced script model based on the parameterized waveforms which incorporate an acoustic model to detect voice changes between different speakers and a language model that uses rules of language construction to maintain coherent text, wherein the acoustic model and the language model are both derived from a corpus speech database;

testing the generated enhanced script model by playing and validating the recorded rehearsal against the generated enhanced script; and clarifying the enhanced script to resolve pattern mismatches between the generated enhanced script model and the recorded rehearsal.

11. The non-transitory computer readable medium of claim 3, wherein the registered microphone is a first registered microphone, wherein the embedded performance information comprises a first stage position associated with the first registered microphone and the first actor designated to speak into the first registered microphone during the scripted live performance.

12. The non-transitory computer readable medium of claim 11, wherein the synchronized captioning program further comprises sets of instructions for:

registering a second microphone as a second live streaming source that will be used to capture speech during performance of the scripted live performance;

assigning the second live streaming source to a second actor designated to speak into the second registered microphone during the scripted live performance, wherein the embedded performance information further comprises a second stage position that is different from the first stage position and is associated with the second registered microphone and the second actor designated to speak into the second registered microphone during the scripted live performance.

13. The non-transitory computer readable medium of claim 3, wherein the embedded performance information comprises a stage effect associated with a sound effect set to occur during the scripted live performance, wherein the set of instructions for displaying the captions on the registered caption display device during performance of the scripted live performance comprises a set of instructions for displaying a name of the sound effect when the sound effect is set to occur during the scripted live performance.

14. The non-transitory computer readable medium of claim 12, wherein the set of instructions for assigning the first live streaming source to the first actor designated to speak into the first registered microphone during the scripted live performance comprises sets of instructions for:

assigning the first live streaming source to the first actor for a first time segment at which to display captions in connection with the first actor speaking into the first registered microphone; and assigning the first live streaming source to the second actor for a second time segment at which to display captions in connection with the second actor speaking into the first registered microphone.

15. The non-transitory computer readable medium of claim 14, wherein the set of instructions for assigning the second live streaming source to the second actor designated to speak into the second registered microphone during the scripted live performance comprises sets of instructions for:

assigning the second live streaming source to the second actor for a third time segment at which to display captions in connection with the second actor speaking into the second registered microphone; and assigning the second live streaming source to the first actor for a fourth time segment at which to display captions in connection with the first actor speaking into the second registered microphone.

16. The non-transitory computer readable medium of claim 15, wherein the first time segment is different from the fourth time segment, wherein the second time segment is different from the third time segment.

17. The non-transitory computer readable medium of claim 1, wherein the set of instructions for displaying the captions on the registered caption display device during performance of the scripted live performance comprises sets of instructions for:

setting a listen mode that increments time during performance of the scripted live performance;

continually displaying the captions on the registered caption display device as presently transmitted by a host during performance of the scripted live performance;

determining whether to pause the continual display of the captions presently transmitted by the host;

pausing the continual display of the captions on the registered caption display device as presently transmitted by the host upon receiving a viewer-initiated change to set a past captions viewing mode;

displaying past captions on the registered caption display device as stored in a buffer after previous transmission by the host during the scripted live performance;

saving all captions presently transmitted by the host in the buffer while in the past captions viewing mode;

reverting back to the listen mode at the present incremented time upon receiving a viewer-initiated play of the captioning for the scripted live performance; and displaying the captions on the registered caption display device starting at the present incremented time and as presently transmitted by the host during performance of the scripted live performance.

\* \* \* \* \*